F. LAYAUX.

BEDSTEAD AND TESTER.

No. 4,414. Reissued June 6, 1871.

Witnesses.

H. C. Raymond

H. A. Daniels

Francis Layaux, Inventor by C. S. Whitman Attorney

529 Seventh St.

Washington D. C

THE NORRIS PETERS CO., PHOTO-LITHO., WASHINGTON, D. C.

UNITED STATES PATENT OFFICE.

FRANÇOIS LAYAUX, OF MONROE, LOUISIANA.

IMPROVEMENT IN BEDSTEADS AND TESTERS.

Specification forming part of Letters Patent No. 106,842, dated August 30, 1870; reissue No. 4,414, dated June 6, 1871.

*To all whom it may concern:*

Be it known that I, FRANÇOIS LAYAUX, of Monroe, in the parish of Ouachita and State of Louisiana, have invented certain Improvements in Bedsteads for Supporting Mosquito-Nets; and do hereby declare the following to be a full description of the same, reference being had to the accompaying drawing.

My invention relates to that class of bedsteads upon which mosquito-nets are used; and the nature thereof consists in combining and arranging posts which may be attached to any ordinary bedstead with a tester, on each of the under sides of which rods are placed supporting sliding rings, to which the upper edges of the net are fastened, there being also a cross-bar that slides on the said rods, on which bar is also placed net-rings.

In the accompanying drawing, which illustrates my invention and forms a part of the specification thereof, in which corresponding parts are illustrated by similar letters—

Figure 1:
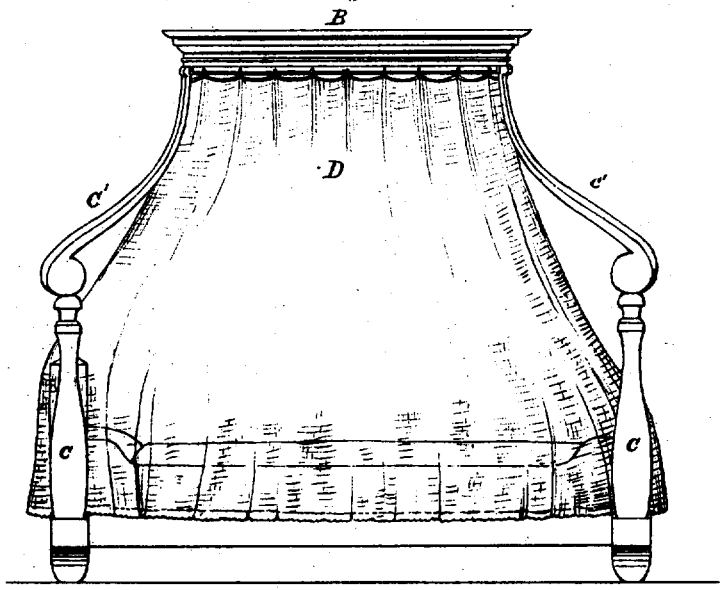
Figure 3:
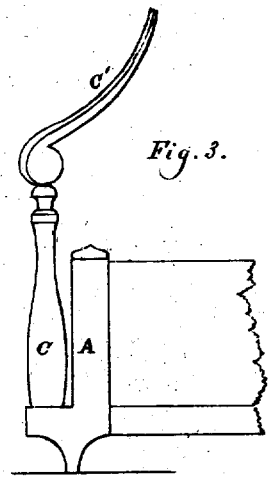
Figure 2:
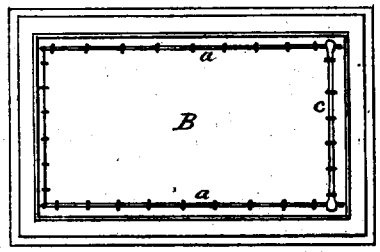

Figure 1 is a side elevation of an ordinary bedstead with my invention applied thereto. Fig. 2 is a bottom view of the tester, illustrating the arrangement of the longitudinal and transverse rods. Fig. 3 illustrates more in detail the relative position of the bed-posts.

The construction, operation, and relative arrangement of the component parts of my invention are as follows: To the posts A of an ordinary bedstead are attached the supplemental posts C. Between the said posts A and C is an open space, within which the folds of the netting drop entirely clear and outside of the surface of the bed. The upper curvilinear sections of the posts C′ incline inward at an angle of about forty-five degrees, and are attached to the corners of the tester B in order to allow the net D to fit closely by its own weight about the bed-rails and sides of the bed. The longitudinal rods *a* are secured to the sides of the tester, and provided with movable rings capable of being alternated to and fro thereon by the transverse sliding bar *c*, which is also provided with net-rings. The ends of the longitudinal rods opposite to the transverse bar are connected together by a stationary cord or bar-supporting rings, to which a portion of the net is attached.

The obvious advantages following from the construction and arrangement of parts herein described are that the appliances for supporting and operating the net may be readily applied to bedsteads of various widths and lengths. The net is held by its own weight closely about the edges of the bed when in use, and may be folded in a small compass for the purpose of keeping it out of the way when the bed over which it is hung is not in use.

Having thus described the construction and operation of my invention, I will indicate what I claim and desire to secure by Letters Patent in the following clause—that is to say:

The combination of the posts C C′, tester B, inside posts A, and net D, when constructed and operating as and for the purpose herein described.

In testimony that I claim the foregoing I have hereunto set my hand this 17th day of May, 1871.

F. LAYAUX.

Witnesses:
C. S. WHITMAN,
H. A. DANIELS.